(12) United States Patent
Strandemar et al.

(10) Patent No.: US 9,804,031 B2
(45) Date of Patent: Oct. 31, 2017

(54) APPARATUS AND METHOD TO CALCULATE ENERGY DISSIPATED FROM AN OBJECT

(71) Applicant: FLIR Systems AB, Täby (SE)

(72) Inventors: Katrin Strandemar, Rimbo (SE); Henrik Jönsson, Stockholm (SE); Torbjörn Hamrelius, Sollentuna (SE); Gunnar Palm, Jarfalla (SE)

(73) Assignee: FLIR Systems AB (SE)

( * ) Notice: Subject to any disclaimer, the term of this patent is extended or adjusted under 35 U.S.C. 154(b) by 552 days.

(21) Appl. No.: 14/470,762

(22) Filed: Aug. 27, 2014

(65) Prior Publication Data

US 2015/0049783 A1 Feb. 19, 2015

Related U.S. Application Data

(63) Continuation of application No. 13/774,870, filed on Feb. 22, 2013, now Pat. No. 8,823,803, which is a
(Continued)

(51) Int. Cl.
*G01J 5/02* (2006.01)
*G02B 13/14* (2006.01)
(Continued)

(52) U.S. Cl.
CPC ............ *G01J 5/025* (2013.01); *G01J 5/10* (2013.01); *G02B 13/14* (2013.01); *H04N 5/33* (2013.01);
(Continued)

(58) Field of Classification Search
CPC .. G01J 5/025; G01J 5/10; G01J 5/0275; G01J 2005/0077; G01J 2005/0085;
(Continued)

(56) References Cited

U.S. PATENT DOCUMENTS 4,343,182 A * 8/1982 Pompei .................... G01J 5/02
374/117
4,896,281 A * 1/1990 Mack ..................... G01N 25/72
374/121
(Continued)

FOREIGN PATENT DOCUMENTS

JP 6235675 8/1994

*Primary Examiner* — Lisa Caputo
*Assistant Examiner* — Philip Cotey
(74) *Attorney, Agent, or Firm* — Haynes and Boone, LLP

(57) ABSTRACT

An IR camera includes: a thermal radiation capturing arrangement for capturing thermal radiation of an imaged view in response to input control unit(s) receiving user inputs from a user of the IR camera; a processing unit arranged to process the thermal radiation data in order for the thermal radiation data to be displayed by an IR camera display as thermal images; and an IR camera display arranged to display thermal images to a user of the IR camera. The processing unit is further arranged to determine at least one temperature reference value representing the temperature of the surrounding environment of the imaged view; and calculate at least one output power value indicative of an amount of energy dissipated in a part of the imaged view by using the temperature value of the thermal radiation data corresponding to said part of the imaged view and the at least one determined temperature reference value.

20 Claims, 6 Drawing Sheets

Related U.S. Application Data continuation of application No. 12/569,847, filed on Sep. 29, 2009, now Pat. No. 8,384,783.

(51) Int. Cl.
*H04N 5/33* (2006.01)
*G01J 5/10* (2006.01)
*G01J 5/00* (2006.01)
*G01J 5/06* (2006.01)
*G01S 17/08* (2006.01)
*G01S 17/88* (2006.01)

(52) U.S. Cl.
CPC ..... *G01J 5/0275* (2013.01); *G01J 2005/0077* (2013.01); *G01J 2005/0085* (2013.01); *G01J 2005/068* (2013.01); *G01S 17/08* (2013.01); *G01S 17/88* (2013.01)

(58) Field of Classification Search
CPC ..... G01J 2005/068; G02B 13/14; H04N 5/33; G01S 17/08; G01S 17/88
See application file for complete search history.

(56) References Cited

U.S. PATENT DOCUMENTS

| | | | |
|---|---|---|---|
| 4,906,105 A * | 3/1990 | Geake | G01J 5/12 374/121 |
| 5,734,466 A | 3/1998 | George et al. | |
| 5,823,682 A * | 10/1998 | Betz | G01J 5/12 374/130 |
| 6,353,223 B1 | 3/2002 | Ookawa | |
| 6,367,969 B1 | 4/2002 | Ringermacher et al. | |
| 6,606,115 B1 | 8/2003 | Alicandro et al. | |
| 7,084,405 B1 * | 8/2006 | Malyutenko | H04N 5/33 250/370.08 |
| 8,136,984 B1 | 3/2012 | Heinke | |
| 8,384,783 B2 * | 2/2013 | Strandemar | G01J 5/025 250/330 |
| 2004/0003914 A1 | 1/2004 | Avila | |
| 2005/0205773 A1 | 9/2005 | Fauci et al. | |
| 2006/0039114 A1 * | 2/2006 | Hamann | H01L 22/34 361/704 |
| 2006/0219920 A1 | 10/2006 | Wijk et al. | |
| 2006/0289772 A1 | 12/2006 | Johnson et al. | |
| 2007/0087311 A1 * | 4/2007 | Garvey | G01J 5/00 434/21 |
| 2007/0152153 A1 * | 7/2007 | Bevan | G01J 5/0003 250/338.1 |
| 2008/0149861 A1 * | 6/2008 | Wilcken | G01J 5/522 250/503.1 |
| 2008/0156991 A1 | 7/2008 | Hu et al. | |
| 2008/0197284 A1 | 8/2008 | Ebenstein et al. | |
| 2008/0210872 A1 * | 9/2008 | Grimberg | G01J 5/522 250/339.04 |
| 2009/0245322 A1 * | 10/2009 | Hudgings | G01K 11/125 374/45 |

\* cited by examiner

APPARATUS AND METHOD TO CALCULATE ENERGY DISSIPATED FROM AN OBJECT

CROSS-REFERENCE TO RELATED APPLICATIONS

This patent application is a continuation of U.S. patent application Ser. No. 13/774,870 filed Feb. 22, 2013, which is a continuation of U.S. patent application Ser. No. 12/569,847 filed Sep. 29, 2009, all of which are incorporated herein by reference in their entirety.

TECHNICAL FIELD

The present technology relates in general to IR cameras and methods for use in a processing unit of IR cameras, in particular to IR camera and methods for capturing IR radiation data of an imaged view.

BACKGROUND

Infrared (IR) thermal cameras can be used in a number of different situations, for example, when inspecting or surveying complex electrical systems such as transformers, switch-gears etc., or water carrying systems such as heat exchangers, radiators etc. IR cameras are used for capturing and storing thermal radiation data. This thermal radiation data may then be displayed and viewed as thermal images and analyzed in order to, for example, find faulty electrical wirings or couplings, leaking water pipes, etc.

However, various procedures and methods are being used in order to properly analyse the thermal radiation data and/or the thermal images of the IR camera, and these are not necessarily particularly intuitive and easily understandable by a user of the IR camera. The analysis of the thermal radiation data and/or the thermal images of an IR camera may also be a time-consuming task and may thus preclude a user of an IR camera from making decisions, predictions, and/or recommendations to clients while being on site and performing the IR imaging.

SUMMARY

Accordingly, there is a need to provide an IR camera with increased usability when analysing thermal images.

In order to solve the above-mentioned and other problems, in an exemplary embodiment, an IR camera comprises: a thermal radiation capturing arrangement for capturing thermal radiation of an imaged view in response to an input control unit(s) receiving inputs from a user of the IR camera; a processing unit arranged to process the thermal radiation data in order for the thermal radiation data to be displayed by an IR camera display as thermal images; and an IR camera display arranged to display thermal images to a user of the IR camera. The processing unit of the IR camera may be further arranged to: determine at least one temperature reference value representing the temperature of the surrounding environment of the imaged view; and calculate at least one output power value indicative of an amount of energy dissipated in a part of the imaged view by using the temperature value of the thermal radiation data corresponding to said part of the imaged view and the at least one determined temperature reference value.

The exemplary embodiment may increase usability to a user of an IR camera when analysing the thermal images of the IR camera by enabling a calculation of the output power dissipated in an imaged view. This also allows a user of the IR camera to achieve an estimate of the energy properties of an imaged view in a simple and easy manner.

The processing unit of the IR camera may also be arranged to control the IR camera display to display the at least one calculated output power value to a user of the IR camera in place of the corresponding temperature pixel in the thermal image. This enables the user of the IR camera to monitor the outputted power density of the energy radiating from an imaged view directly in the IR camera display as the object is being imaged by the IR camera.

The processing unit of the IR camera may also be arranged to determine a first subset of the thermal radiation data as a thermal image object area representing an object in the imaged view for which an output power value is to be determined; and calculate an object output power value indicative of the amount of energy outputted from the object in the imaged view based upon output power values of the determined thermal image object area in the thermal radiation data. This may provide increased usability to a user of an IR camera when analysing the thermal images of the IR camera by enabling a calculation of the output power radiating from an object in an imaged view. This also allows a user of the IR camera to achieve an estimate of the energy properties of an imaged object in a simple and easy manner The processing unit of the IR camera may also be arranged to control the IR camera display to display the calculated object output power value to a user of the IR camera together with the thermal images. This enables the user of the IR camera to monitor the output power radiating from an object directly in the IR camera display as the object is being imaged by the IR camera. The processing unit of the IR camera may also be arranged to receive information comprising current energy price information and time span information. This may be performed by the user of the IR camera using the input control devices. By being further arranged to calculate the energy outputted by the object in the imaged view based on this time span information and the object output power value, an estimated cost of the total energy consumption may be based on the received current energy price information and the outputted energy. This cost estimate may then be displayed by the IR camera display to the user of the IR camera together with the thermal images, such that a fast and efficient energy cost evaluation for the object may be performed immediately on site.

The processing unit of the IR camera may further be arranged to determine the thermal image object area in the thermal radiation data by receiving information from the input control unit(s) indicating a subset of the thermal radiation data as the thermal image object area. This allows a user of the IR camera to manually indicate an area in the displayed IR thermal images of the IR camera display representing the object for which the user of the IR camera desires the output power to be determined; the indicated area will correlate to a particular subset of the thermal radiation data. While this alleviates the need for any thermal image segmentation to be performed automatically by the IR camera, an area representing the object for which the user of the IR camera desires the output power to be determined may also be established using a temperature threshold value. This enables the IR camera to automatically identify a subset of the thermal radiation data as the thermal image object area.

Furthermore, the processing unit of the IR camera may be arranged to receive information from the input control unit(s) comprising a value of the actual physical surface area of the object in the imaged view facing towards the IR camera, whereby this area value may be used when calculating the object output power value. This alleviates the need for an object area estimation to be performed automatically by the IR camera. The processing unit of the IR camera may also be arranged to receive information from a distance determining unit comprised in the IR camera which comprises the distance between the actual physical object captured in the imaged view and the IR camera, determine an object field-of-view of the determined thermal image object area in the thermal radiation data, estimate the actual physical surface area of the object in the imaged view facing towards the IR camera based upon the received distance and the determined object field-of-view, and use this estimation when calculating the object output power value. This enables the IR camera to automatically estimate the actual physical surface area of the object in the imaged view facing towards the IR camera.

Additionally, the processing unit of the IR camera may be arranged to receive information from the input control unit(s) comprising a form indicator which is indicative of the shape or form of the actual physical object in the imaged view, and use this form indicator or a corresponding value when calculating the object output power value. This enables the IR camera to use the object output power value calculated using the estimate of the actual physical surface area of the object facing towards the IR camera for estimating a total object output power value for the entire physical object by taking actual physical surface areas of the object not visible in the imaged view into consideration in the power calculation. The processing unit of the IR camera may also be arranged to, when the distance comprised in the information from the distance determining unit is a distance map comprising separate distance values for different subsets of the thermal radiation data, estimate the shape or form of the actual physical object in the imaged view using the distance map, and use this estimate when calculating the object output power value. This enables the IR camera to more accurately estimate actual physical surface areas of the object in the imaged view, and consequently estimating an improved total object output power value for the entire physical object viewed.

The processing unit of the IR camera may furthermore be arranged to determine the at least one temperature reference value by receiving information from the input control unit(s) comprising a temperature value(s) to be used as the at least one temperature reference value. This allows a user of the IR camera to input the at least one temperature reference value into the IR camera manually. The processing unit of the IR camera may also be arranged to determine a thermal image reference area in the thermal radiation data that is not part of the determined thermal image object area in the thermal radiation data, calculate a representative temperature value for the thermal image reference area in the thermal radiation data, and using the representative temperature value for the thermal image reference area in the thermal radiation data as the at least one temperature reference value when determining the at least one temperature reference value. Alternatively, the processing unit of the IR camera may be arranged to determine the at least one temperature reference value by receiving temperature value(s) from at least one temperature measurement unit(s) comprised in the IR camera. The two latter features allows the IR camera to automatically determine the at least one temperature reference value to be used in the power calculations.

According to another exemplary embodiment, a method for use in a processing unit of an IR camera capturing thermal radiation data of an imaged view is provided. The method may comprise: determining a subset of the thermal radiation data as a thermal image object area representing an object in the imaged view for which an output power value is to be determined; determining at least one temperature reference value representing the temperature of the surrounding environment of the object in the imaged view; and calculating an object output power value indicative of the amount of energy dissipated from the object in the imaged view based upon the determined thermal image object area in the thermal radiation data, and the at least one determined temperature reference value.

The method may further comprise: controlling the IR camera display to display the calculated object output power value to a user of the IR camera together with the thermal images. Alternatively, the method may also comprise: receiving information comprising current energy price information and time span information, calculating a total energy output value for the object in the imaged view based on the time span information and the calculated object output power value, calculating a total energy cost value based on the current energy price information and the total energy output value, and controlling the IR camera display to display total energy cost value to a user of the IR camera together with the thermal images.

According to yet another exemplary embodiment, a computer program product for use in an IR camera is provided, which comprises computer executable instructions that, when run in a processing unit in the IR camera cause the processing unit in the IR camera to: determine a subset of the thermal radiation data captured by the IR camera as a thermal image object area representing an object in the imaged view for which an output power value is to be determined; determine at least one temperature reference value representing the temperature of the surrounding environment of the object in the imaged view; and calculate an object output power value indicative of the amount of energy outputted from the object in the imaged view based upon the determined thermal image object area in the thermal radiation data, and the at least one determined temperature reference value.

Further embodiments of the IR camera, the method, and the computer program product are set forth in the dependent claims and the rest of the specification.

DETAILED DESCRIPTION

Figure 1:
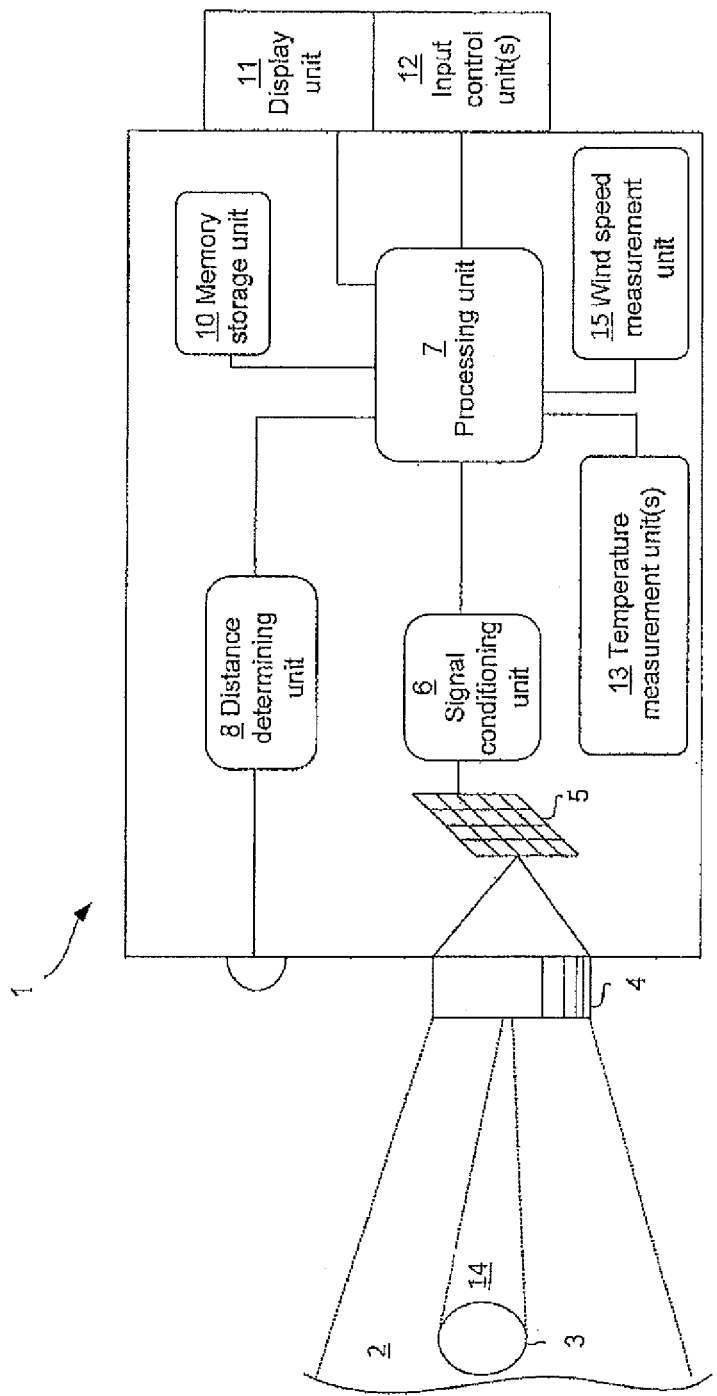
FIG. 1 shows an IR camera according to an embodiment.

FIG. 1 shows an IR camera 1 according to an exemplary embodiment. The IR camera 1 may capture thermal radiation of an imaged view 2 in response to receiving inputs from a user of the IR camera 1, and present the thermal radiation in the form of thermal images to a user of the IR camera 1 via an IR camera display 11. The IR camera 1 may comprise a thermal radiation capturing arrangement for capturing thermal radiation comprising at least one lens arrangement 4, a detector element 5 and a signal conditioning unit 6. The incoming radiation to the IR camera 1 is focused by at least one lens arrangement 4 onto the detector element 5. The detector element 5 may typically be a matrix of detector elements, each of which may detect radiation from a corresponding area, for example, a wall, water pipes, electrical connectors, etc., that is being imaged. The detector element 5 may, for example, be a focal plane array (FPA).

From the detector element 5, captured thermal radiation data $T_{x,y}$ may be fed to a signal comprising signal values to a signal conditioning unit 6. The signal conditioning unit 6 may perform conventional signal conditioning, such as, for example, corrections for the inherent offset, gain drift, etc, and convert the signal values into thermal radiation data $T_{x,y}$ comprising temperature values. The signal conditioning unit 6 is arranged to output a thermal radiation signal comprising the thermal radiation data $T_{x,y}$ to a processing unit 7.

The processing unit 7 is arranged to receive the thermal radiation signal comprising the thermal radiation data $T_{x,y}$ from the signal conditioning unit 6. The processing unit 7 is also arranged to control an IR camera display 11, for example, a viewfinder, a digital display and/or touch screen provided on the IR camera housing. The processing unit 7 is further arranged to process the thermal radiation data $T_{x,y}$ in order for the thermal radiation data $T_{x,y}$ to be displayed by the IR camera display 11 as thermal images. The processing unit 7 may output a thermal image signal to the IR camera display 11. The thermal image signal to the IR camera display 11 may also comprise additional information other than the thermal images to be displayed by the IR camera display 11. The thermal, radiation data recorded by the IR camera 1 can thus controlled to be displayed in the IR camera display 11 as thermal images, with or without the additional information, and be presented to a user of the IR camera 1. The operation of the processing unit 7 in the IR camera 1 is described in more detail in the exemplary embodiments presented below with reference to FIGS. 2-5.

It should be noted that the signal conditioning unit 6 and the processing unit 7 may be provided as one physical unit, or alternatively as a plurality of logically interconnected units. The signal conditioning unit 6 and the processing unit 7 may also comprise processing means or logic for performing the functionality of the IR camera 1. This functionality may be implemented partly by means of a software or computer program. The signal conditioning unit 6 and the processing unit 7 may also comprise storage means or a memory unit for storing such a computer program and processing means or a processing unit, such as a microprocessor, for executing the computer program. The storage means may be a readable storage medium, but also a memory storage unit 10 separated from, but connected to the signal conditioning unit 6 and the processing unit 7. When, in the following, it is described that the IR camera 1, the signal conditioning unit 6 or the processing unit 7 performs a certain function or operation it is to be understood that the signal conditioning unit 6 and/or the processing unit 7 may use the processing means or logic to execute a certain part of the program which is stored in the storage means.

The processing unit 7 may also be connected to and/or arranged to communicate with a distance determining unit 8 arranged to determine the distance between an object 3 in the imaged view 2 and the IR camera 1 and output the measured distance to the processing unit 7. The distance determining unit 8 may, for example, be the at least one lens arrangement 4 using focusing operations to determine the distance to an object 3, a laser distance measurement unit measuring the distance to the object 3 using laser, or any other type of distance measuring unit. The processing unit 7 may also be connected to and/or arranged to communicate with at least one input control unit(s) 12 arranged to receive manual inputs from a user of the IR camera 1 and output the manual inputs to the processing unit 7. The at least one input control unit(s) 12 may, for example, be buttons and/or joysticks, or be incorporated in the IR camera display 11 as a touch screen functionality. The processing unit 7 may also be connected to and/or arranged to communicate with at least one temperature measurement unit(s) 13 arranged to measure the surrounding air temperature and/or a surface temperature and output the measured air temperature values and/or surface temperature values to the processing unit 7. The at least one temperature measurement unit(s) 13 may be integrated into the IR camera 1 (as shown in FIG. 1), or be comprised in a separate unit arranged to be connected to or communicate with the IR camera 1 from the outside of the IR camera 1 (e.g. by wire or wirelessly). The at least one temperature measurement unit(s) 13 may comprise an air temperature measurement unit and/or a surface contact measuring unit. The processing unit 7 may also be connected to and/or arranged to communicate with a wind speed measurement unit 15 arranged to measure the wind speed of the air surrounding the object 3 and output measured wind speed values to the processing unit 7. The at least one air temperature measurement unit(s) 13 may be integrated into the IR camera 1 (as shown in FIG. 1), or be comprised in a separate unit arranged to be connected to or communicate with the IR camera 1 from the outside of the IR camera 1 (e.g. by wire or wirelessly). The operation and use of the distance determining unit 8, the at least one input control unit(s) 12, the at least one air temperature measurement unit(s) 13, and the wind speed measurement unit 15 are described in more detail in the exemplary embodiments presented below with reference to FIGS. 2-5.

Figure 2:
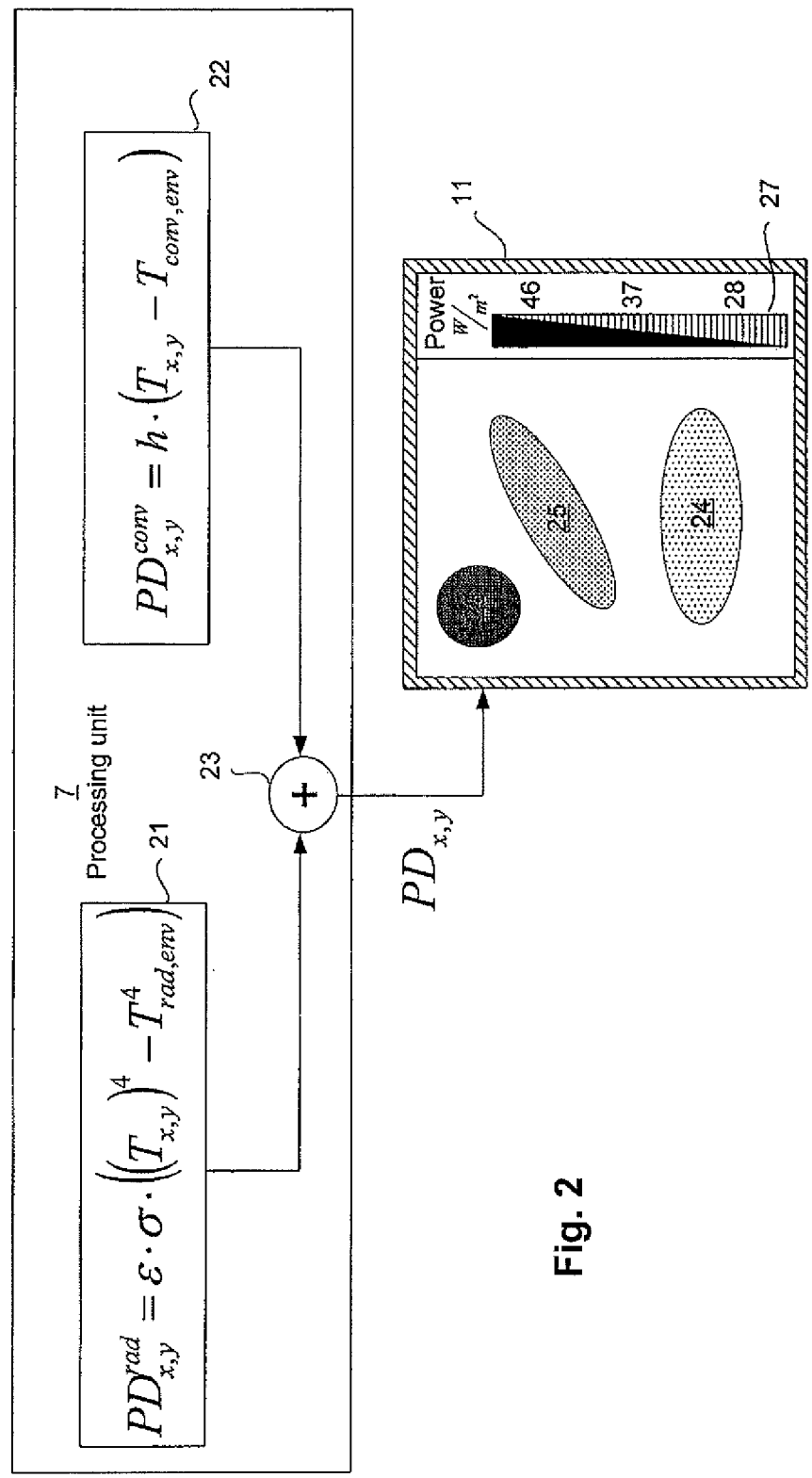
FIG. 2 shows an exemplary operation of an IR camera according to an embodiment.

FIG. 2 shows an exemplary operation of the processing unit 7 in an embodiment of an IR camera 1. The processing unit 7 in the IR camera is arranged to perform calculations of power density values $PD_{x,y}$ in the imaged view 2 indicative of an amount of energy dissipated in the imaged view 2 for temperature values of the thermal radiation data $T_{x,y}$ by using at least one determined temperature reference value.

By having the processing unit 7 in the IR camera 1 arranged to perform calculations of the power density values $PD_{x,y}$, the IR camera 1 is able to calculate and/or display the power density distribution of an imaged view 2. Thus, the IR camera 1 may increase usability to a user of the IR camera 1 when the user of the IR camera 1 is attempting to analyze the imaged view 2 captured by the IR camera 1. This further may allow a user of the IR camera 1 to achieve an estimate of the energy properties of the imaged view 2 in a simple and easy manner without having to perform any manual calculations of the same.

The processing unit 7 may be arranged to perform the calculation of the power dissipated in the imaged view 2 (referred to herein as an output power values or output power density values, $PD_{x,y}$) based on calculated values of the energy exchanged through radiation from a surface(s) in the imaged view 2 to its surrounding environment (referred to herein as the radiated power values, $PD_{x,y}^{rad}$). This is illustrated by the logical block 21 in FIG. 2. The processing unit 7 may further be arranged to perform the calculation of the output power value $PD_{x,y}$ based on the calculated value of the heat transfer due to natural convection from a surface(s) in the imaged view 2 to its surrounding environment (referred to herein as the convection power value, $PD_{x,y}^{conv}$). This is illustrated by the logical block 22 in FIG. 2. As is illustrated by the logical block 23, the output power values $PD_{x,y}$ may be calculated by the processing unit 7 according to the following equation, Eq.1:

$$PD_{x,y} = PD_{x,y}^{rad} + PD_{x,y}^{conv} \quad (Eq. 1)$$

Although the output power value $PD_{x,y}$ according to Eq. 1 is useful since it sums the power outputted in the imaged view 2 through both radiation and convection and thus may achieve a more accurate estimation of a value indicative of the outputted power in the imaged view, it should be noted that the output power value $PD_{x,y}$ may also be calculated by the processing unit 7 as either the radiated power value $PD_{x,y}^{rad}$ or the convection power value, $PD_{x,y}^{conv}$.

The radiated power values $PD_{x,y}^{rad}$ in the imaged view 2 may be calculated in the logical block 21 by the processing unit 7 according to the following equation, Eq.2:

$$PD_{x,y}^{rad} = \epsilon \cdot \sigma \cdot ((T_{x,y})^4 - T_{rad,env}^4) \quad (Eq. 2)$$

wherein $\epsilon$ is the emissivity of the surface(s) in the imaged view 2, $\sigma$ is the Stefan-Boltzmann constant, $5.67 \cdot 10^{-8}$ W/m$^2$K$^4$, $T_{x,y}$ is the temperature values at positions (x, y) in the thermal radiation data received from the detector element 5 and the signal conditioning unit 6, $T_{rad,env}$ is a temperature reference value representing the temperature of the surrounding environment of the imaged view 2.

The convection power values $PD_{x,y}^{conv}$ in the imaged view 2 may be calculated in the logical block 22 by the processing unit 7 according to the following equation, Eq.3:

$$PD_{x,y}^{conv} = h \cdot (T_{x,y} - T_{conv,env}) \quad (Eq. 3)$$

wherein h is a heat transfer coefficient [W/m$^2$K], $T_{conv,env}$ is a temperature reference value representing the temperature of the surrounding environment of the imaged view 2.

Thus, combining Eq.1-3, the output power values $PD_{x,y}$ for each of the temperature values of the thermal radiation data $T_{x,y}$ may be calculated by the processing unit 7 according to the following equation, Eq. 4:

$$PD_{x,y} = PD_{x,y}^{rad} + PD_{x,y}^{conv} = \epsilon \cdot \sigma \cdot ((T_{x,y})^4 - T_{rad,env}^4) + h \cdot (T_{x,y} - T_{conv,env}) \quad (Eq. 4)$$

As the processing unit 7 in the IR camera 1 has calculated the output power values $PD_{x,y}$ in accordance with the above, the processing unit 7 may be arranged to control the IR camera display 11 to display the calculated output power values $PD_{x,y}$ to a user of the IR camera 1 in place of the thermal images, e.g. as shown in FIG. 2. In the IR camera display 11 shown in FIG. 2, the thermal image pixels in a first display area 24 show a first subset of the thermal image radiation data $T_{x,y}$ for which the output power values $PD_{x,y}$ are the same, for example, 28 W/m$^2$. The IR camera display 11 may be arranged to present the output power values $PD_{x,y}$ in IR camera display 11 in the similar manner as for thermal image, such as, for example, using a colour palette to indicate different output power values $PD_{x,y}$, and a indication scale 27, etc. Furthermore, in the IR camera display 11 shown in FIG. 2, the thermal image pixels in a second display area 25 show a second subset of the thermal image radiation data $T_{x,y}$ for which the output power values $PD_{x,y}$ are the same, for example, 37 W/m$^2$, and the thermal image pixels in a third display area 26 show a third subset of the thermal image radiation data $T_{x,y}$ for which the output power values $PD_{x,y}$ are the same, for example, 46 W/m$^2$. If the output power values $PD_{x,y}$ are calculated by the processing unit 7 as either the radiated power values $PD_{x,y}^{rad}$ or the convection power values $PD_{x,y}^{conv}$, the processing unit 7 may be arranged to control the IR camera display 11 to also display information indicating to the user of the IR camera 1 that this is the case. The processing unit 7 may also be arranged to store the output power values $PD_{x,y}$ in the memory storage unit 10, for example, in order to perform post-processing of the output power values $PD_{x,y}$.

However, in order for the processing unit 7 in the IR camera 1 to calculate the output power values $PD_{x,y}$, the parameters $T_{rad,env}$, $T_{conv,env}$, h and $\epsilon$ comprised in Eq. 1-4 have to be determined by the processing unit 7.

The temperature reference values $T_{rad,env}$ and $T_{conv,env}$ representing the temperature of the surrounding environment of the imaged view 2 may be determined by the processing unit 7 by receiving information from the input control unit(s) 12 comprising at least one temperature value to be used as both or one of the temperature reference values $T_{rad,env}$ and $T_{conv,env}$. The user of the IR camera 1 may thus be arranged to manually enter a temperature value to the processing unit 7, which may be used by the processing unit 7 as both or one of the temperature reference values $T_{rad,env}$ and $T_{conv,env}$. Alternatively, the processing unit 7 may be arranged to determine either or both of the temperature reference values $T_{rad,env}$ and $T_{conv,env}$ by receiving a temperature measurement value(s) from the temperature measuring unit(s) 13. This alternative will also allow the processing unit 7 of the IR camera 1 to automatically determine either or both of the temperature reference values $T_{rad,env}$ and $T_{conv,env}$ to be used in the calculation of the output power value $PD_{x,y}$. Any one of the alternatives described above may be used by the processing unit 7 in the IR camera 1 in order to determine the temperature reference value $T_{rad,env}$ and/or the temperature reference value $T_{conv,env}$. Alternatively, the IR camera 1 may use a surface temperature measurement unit arranged to detect a surface temperature for determining the temperature reference value $T_{rad,env}$ and a air temperature measurement unit arranged to detect an air temperature for determining the temperature reference value $T_{conv,env}$.

The heat transfer coefficient h indicates the amount of natural convection occurring at a surface(s) in the imaged view 2, and may be determined by the processing unit 7 by receiving information from the input control unit(s) 12 comprising a heat transfer coefficient value. The heat transfer coefficient value may be inputted manually by a user of the IR camera 1. Alternatively, the heat transfer coefficient value may be based on information indicating the wind speed of the air surrounding the imaged view 2 received from the wind speed measuring unit 15. For a particular wind speed, the processing unit 7 may determine a corresponding heat transfer coefficient value to be used by the processing unit when calculating the output power values $PD_{x,y}$. This may be performed by the processing unit 7 or the memory storage unit 10 comprising a list associating wind speeds with corresponding heat transfer coefficient values. The heat transfer coefficient value may also be set to a suitable default value, such as, for example, $1 \leq h \leq 10$ for indoor environments, and $1 \leq h \leq 100$ for outdoor environments.

The emissivity $\epsilon$ of surface(s) in the imaged view 2 may be determined by the processing unit 7 by receiving information from the input control unit(s) 12 comprising a value of the emissivity of the surface(s). The value of the emissivity ε of the surface(s) may be inputted manually by a user of the IR camera 1. The value of the emissivity ε may also be set to a suitable default value, for example, ε=1.

Figure 3:
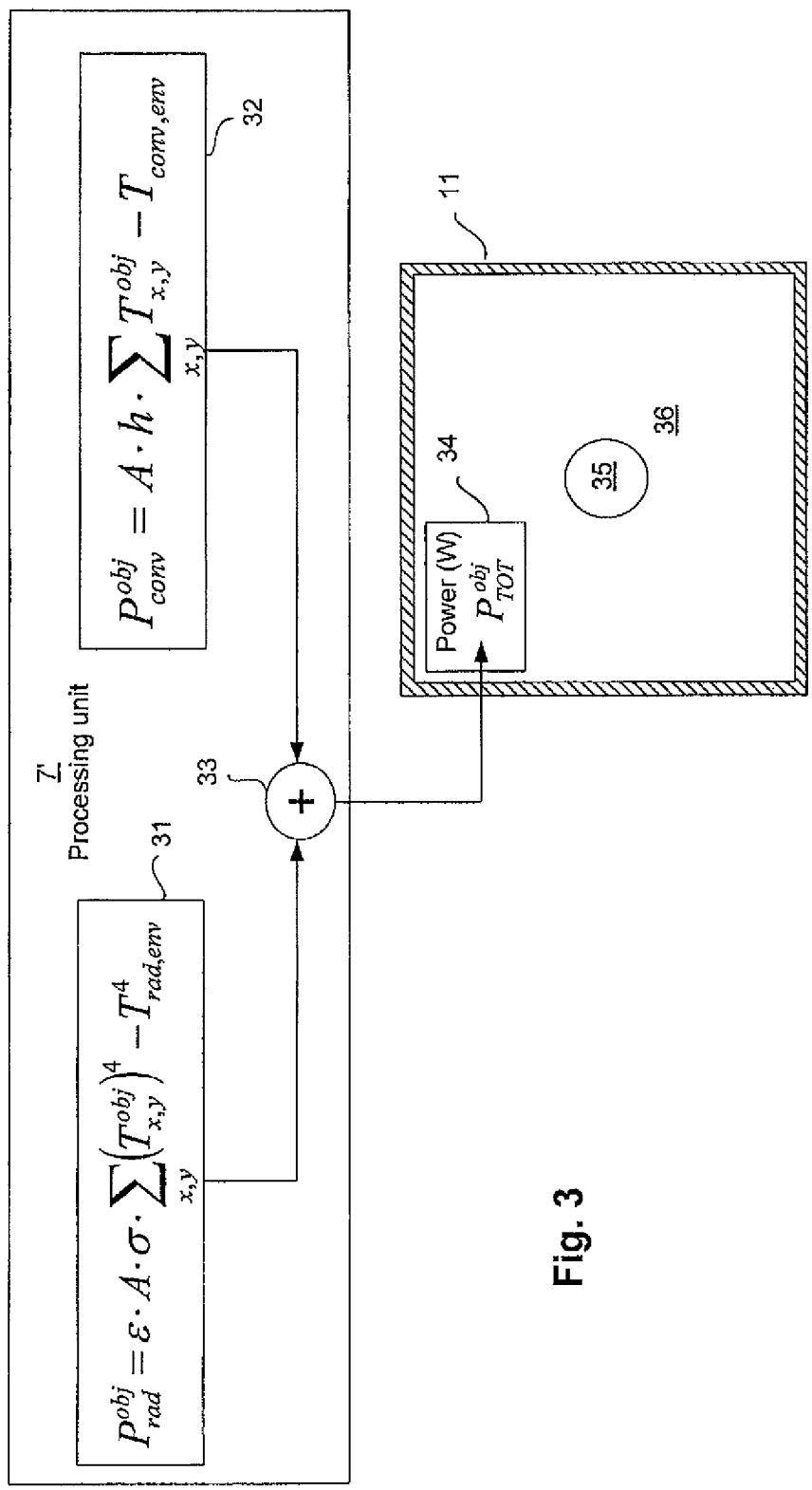
FIG. 3 shows another exemplary operation of an IR camera according to an embodiment.

FIG. 3 shows another exemplary operation of the processing unit 7 in an embodiment of an IR camera 1. As will become apparent in the following, by using information received from the signal conditioning unit 6, the distance determining unit 8, the memory storage 10, the input control unit(s) 12, the temperature measurement unit(s) 13, and/or the wind speed measurement unit 15, the processing unit 7 in the IR camera 1 is arranged to perform calculations of the power which is outputted from an object 3 in the imaged view 2. The power outputted from the object 3 may also be referred to as the total heat loss of the object 3 as viewed by the IR camera 1.

By having the processing unit 7 in the IR camera 1 arranged to perform calculations of the power which is outputted from an object 3 in the imaged view 2, the IR camera 1 may increase usability to a user of the IR camera 1 when the user of the IR camera 1 is attempting to analyze the object 3 by viewing the thermal images of the IR camera 1. This may allow a user of the IR camera 1 to achieve an estimate of the energy properties of the imaged object 3 in a simple and easy manner without having to perform any manual calculations of the same.

The processing unit 7 may be arranged to perform the calculation of the power outputted from an object 3 in the imaged view 2 (referred to herein as an object output power value, $P_{TOT}^{obj}$) based on a calculated value of the energy exchanged by the object 3 through radiation from its surface to its surrounding environment (referred to herein as the radiated power value, $P_{rad}^{obj}$). This is illustrated by the logical block 31 in FIG. 3. The processing unit 7 may further be arranged to perform the calculation of the object output power value $P_{TOT}^{obj}$ based on the calculated value of the heat transfer due to natural convection from the object 3 to its surrounding environment (referred to herein as the convection power value, $P_{conv}^{obj}$. This is illustrated by the logical block 32 in FIG. 3. As is illustrated by the logical block 33 and as shown in FIG. 3 (e.g., in a display window 34 in IR camera display 11), the object output power value $P_{TOT}^{obj}$ may be calculated by the processing unit 7 according to the following equation, Eq.5:

$$P_{TOT}^{obj} = P_{rad}^{obj} + P_{conv}^{obj} \quad \text{(Eq.5)}$$

Although the object output power value $P_{TOT}^{obj}$ according to Eq. 1 is useful since it sums the power outputted from the object 3 through both radiation and convection and may thus achieve a more accurate estimation of a value of the outputted power from the object 3. It should be noted that the object output power value $P_{TOT}^{obj}$ may also be calculated by the processing unit 7 as either the radiated power value $P_{rad}^{obj}$ or the convection power value, $P_{conv}^{obj}$.

The radiated power value $P_{rad}^{obj}$ from the object 3 in the imaged view 2 may be calculated in the logical block 31 by the processing unit 7 according to the following equation, Eq. 6:

$$P_{rad}^{obj} = \varepsilon \cdot A \cdot \sigma \cdot \sum_{x,y} (T_{x,y}^{obj})^4 - T_{rad,env}^4 \quad \text{(Eq. 6)}$$

wherein ε is the emissivity of the surface of the object 3,
A is the surface area of the object 3 facing towards and being perceived by 2D-camera view of the IR camera 1,
σ is the Stefan-Boltzmann constant, 5.67·10⁻⁸ W/m²K⁴,
$T_{x,y}^{obj}$ is a first subset of the thermal radiation data $T_{x,y}$ received from the detector element 5 and the signal conditioning unit 6 which has been determined by the processing unit 7 to represent the object 3 in the imaged view 2 (herein referred to as the thermal image object area 35) for which an object output power value $P_{TOT}^{obj}$ is to be determined,
$T_{rad,env}$ is a temperature reference value representing the temperature of the surrounding environment of the object 3 in the imaged view 2.

The convection power value $P_{conv}^{obj}$ from the object 3 in the imaged view 2 may be calculated in the logical block 32 by the processing unit 7 according to the following equation, Eq. 7:

$$P_{conv}^{obj} = A \cdot h \cdot \sum_{x,y} T_{x,y}^{obj} - T_{conv,env} \quad \text{(Eq. 7)}$$

wherein h is a heat transfer coefficient [W/m² K],
$T_{conv,env}$ is a temperature reference value representing the temperature of the surrounding environment of the object 3 in the imaged view 2.

Thus, combining Eq.1-3, the object output power value $P_{TOT}^{obj}$ may be calculated by the processing unit 7 according to the following equation, Eq. 8:

$$\begin{aligned}P_{TOT}^{obj} &= P_{rad}^{obj} + P_{conv}^{obj} \\ &= \varepsilon \cdot A \cdot \sigma \cdot \sum_{x,y} \left( \begin{matrix} (T_{x,y}^{obj})^4 - \\ T_{rad,env}^4 \end{matrix} \right) + A \cdot h \cdot \sum_{x,y} (T_{x,y}^{obj} - T_{conv,env}) \\ &= A \cdot \left( \varepsilon \cdot \sigma \cdot \sum_{x,y} \left( (T_{x,y}^{obj})^4 - T_{rad,env}^4 \right) + h \cdot \sum_{x,y} (T_{x,y}^{obj} - T_{conv,env}) \right) \end{aligned} \quad \text{(Eq. 8)}$$

As the processing unit 7 in the IR camera 1 has calculated the object output power value $P_{TOT}^{obj}$ in accordance with the above, the processing unit 7 may be arranged to control the IR camera display 11 to display the object output power value $P_{TOT}^{obj}$ to a user of the IR camera 1 together with the thermal images, e.g. as shown in FIG. 1. If the object output power value $P_{TOT}^{obj}$ is calculated by the processing unit 7 as either the radiated power value $P_{rad}^{obj}$ or the convection power value, $P_{conv}^{obj}$, the processing unit 7 may be arranged to control the IR camera display 11 to also display information indicating to the user of the IR camera 1 that this is the case.

As can be seen from Eq. 1-4 in the previous embodiment described in reference to FIG. 2 and Eq. 9 below, the object output power value $P_{TOT}^{obj}$ indicative of the amount of energy outputted from the object 3 in the imaged view 2 can be said to be based upon output power values $PD_{x,y}$ belonging to the determined thermal image object area 35 in the thermal radiation data $T_{x,y}$, which may referred to as object output power density values $PD_{x,y}^{obj}$. The object output power density values $PD_{x,y}^{obj}$ can be said to comprise power density values in W/m² for temperature values in the thermal radiation data $T_{x,y}$, which when summed over a defined area, such as, the thermal image object area 35 of the object 3, results in an object output power value $P_{TOT}^{obj}$ in W.

$$P_{TOT}^{obj} = P_{rad}^{obj} + P_{conv}^{obj} \quad \text{(Eq. 9)}$$

$$= \varepsilon \cdot A \cdot \sigma \cdot \sum_{x,y} \left( \frac{(T_{x,y}^{obj})^4 -}{T_{rad,env}^4} \right) + A \cdot h \cdot \sum_{x,y} (T_{x,y}^{obj} - T_{conv,env})$$

$$= A \cdot \left( \varepsilon \cdot \sigma \cdot \sum_{x,y} \left( (T_{x,y}^{obj})^4 - T_{rad,env}^4 \right) + h \cdot \sum_{x,y} (T_{x,y}^{obj} - T_{conv,env}) \right)$$

$$= A \cdot \sum_{x,y} PD_{x,y}^{obj}$$

However, in order for the processing unit 7 in the IR camera 1 to calculate the object output power value $P_{TOT}^{obj}$ the parameters $T_{x,y}^{obj}$, or $PD_{x,y}^{obj}$, and A comprised in Eq. 5-9 have to be determined by the processing unit 7. The parameters $T_{rad,env}$, $T_{conv,env}$, h and ε may be determined by the processing unit 7 in the same manner as described in the previous embodiment described in relation to FIG. 2.

The first subset $T_{x,y}^{obj}$ of the thermal radiation data $T_{x,y}$ corresponds to a thermal image object area 35 in the thermal images displayed on the display unit 11. The thermal image object area 35 represents the object 3 in the imaged view 2 for which an output power value $P_{TOT}^{obj}$ is to be determined. The thermal image object area 35 may be determined by the processing unit 7 by receiving information from the input control unit(s) 12 indicating a particular area in the thermal images displayed on the display unit 11 as the thermal image object area 35. By receiving the information indicating a particular area as the thermal image object area 35, the processing unit 7 may identify the first subset $T_{x,y}^{obj}$ of the thermal radiation data $T_{x,y}$ corresponding to the indicated thermal image object area 35. For example, the user of the IR camera 1 may, using the input control unit(s) 12, place a digital marker or indicator around the particular area in the thermal images to be indicated as the thermal image object area 35 in the thermal images. Alternatively, the thermal image object area 35 and the corresponding first subset $T_{x,y}^{obj}$ of the thermal radiation data $T_{x,y}$ may be determined by the processing unit 7 by using a temperature threshold value. The temperature threshold value will directly indicate a first subset $T_{x,y}^{obj}$ of the thermal radiation data $T_{x,y}$ as the thermal image object area 35. The temperature threshold value may be a user-settable threshold value or a default threshold value. The user of the IR camera 1 may set the temperature threshold value to be used in determining the thermal image object area 35 and the corresponding first subset $T_{x,y}^{obj}$ of the thermal radiation data $T_{x,y}$, by using the input control unit(s) 12. The same procedures may be used in order to determine the object output power density values $PD_{x,y}^{obj}$ from which the object output power value $P_{TOT}^{obj}$ may be calculated as well.

The temperature reference values $T_{rad,env}$ and $T_{conv,env}$ representing the temperature of the surrounding environment of the object 3 in the imaged view 2 may be determined by the processing unit 7 in the same manner as described in the previous embodiment described in relation to FIG. 2.

However, alternatively the processing unit 7 may here be arranged to determine a second subset $T_{x,y}^{ref}$ of the thermal radiation data $T_{x,y}$ as a thermal image reference area 36 (shown in FIG. 3). The thermal image reference area 36 may be determined by the processing unit 7 as the part of the thermal radiation data $T_{x,y}$ that is not a part of the determined thermal image object area 35 in the thermal radiation data $T_{x,y}$, i.e. the first subset $T_{x,y}^{obj}$ of the thermal radiation data $T_{x,y}$. By calculating an temperature value representative for the determined thermal image reference area 36 in the thermal radiation data $T_{x,y}$, the processing unit 7 may determine either or both of the temperature reference values $T_{rad,env}$ and $T_{conv,env}$ as the representative temperature value obtained for the thermal image reference area 36 in the thermal radiation data $T_{x,y}$. The representative temperature value of the thermal image reference area 36 may, for example, be calculated by the processing unit 7 as median or mean value of the thermal radiation data $T_{x,y}$ in the determined thermal image reference area 36. This alternative allows the processing unit 7 of the IR camera 1 to automatically determine either or both of the temperature reference values $T_{rad,env}$ and $T_{conv,env}$ to be used in the calculation of the object output power value $P_{TOT}^{obj}$.

The surface area parameter A represents the actual surface area of the object 3 facing towards and being perceived by 2D-camera view of the IR camera 1 in the imaged view 2. The surface area parameter A may be determined by the processing unit 7 by receiving information from the input control unit(s) 12 comprising a value of the actual physical surface area of the object 3. The user of the IR camera 1 may thus be arranged to manually enter an area value to the processing unit 7 corresponding to the surface of the object 3, which may be used by the processing unit 7 as a value of the surface area parameter A. The value of the surface area parameter A may also be set to a suitable default value.

Alternatively, the processing unit 7 may be arranged to receive information from the distance determining unit 8 comprised in the IR camera 1, wherein the information comprises a distance d between the actual physical object 3 in the imaged view 2 and the IR camera 1. Further, the processing unit 7 may be arranged to determine an object field-of-view $o_{fov}$ 14 of the determined thermal image object area 35 in the thermal radiation data $T_{x,y}$. An object field-of-view $o_{fov}$ 14 of a determined thermal image object area 35 in the thermal radiation data $T_{x,y}$ may be determined by the processing unit 7 by, for example, from the first subset $T_{x,y}^{obj}$ of the thermal radiation data $T_{x,y}$ determined as the thermal image object area 35, determine how much of the total field-of-view 2 of the IR camera 1, i.e. the entire thermal radiation data is occupied by the thermal image object area 35 and then, since the total field-of-view of the IR camera 1 is determined by the type of components incorporated in the IR camera 1 and hence may be known by the processing unit 7, estimate the object field-of-view $o_{fov}$ 14 based upon how much of the total field-of-view of the IR camera 1 is occupied by the thermal image object area 35. Once the distance d to the object 3 has been received and the object field-of-view $o_{fov}$ 14 has been determined, the processing unit 7 may calculate an estimate of the actual physical surface area of the object 3 in the imaged view 2 facing towards and being perceived by 2D-camera view of the IR camera 1, i.e. the surface area parameter A, based upon the received distance d to the object 3 and the determined object field-of-view $o_{fov}$ 14. For example, this may be performed by the processing unit 7 by using the area $a_{x,y}^{pix}$ for each thermal image pixel in the object field-of-view $o_{fov}$ 14 of the determined thermal image object area 35 according to the following equation, Eq. 10-11:

$$a_{x,y}^{pix} = (2 \cdot d \cdot \tan(o_{fov}^{pix}/2))^2 \quad \text{(Eq. 10)}$$

$$A = \sum_{x,y} a_{x,y}^{pix} \quad \text{(Eq. 11)}$$

The field-of-view for each pixel $o_{fov}^{pix}$ in the object field-of-view $o_{fov}$ 14 of the determined thermal image object area 35 may, for example, by dividing the total field-of-view of the IR camera 1 by the resolution of the detector element 5 in the IR camera 1.

According to another alternative, the processing unit 7 may be arranged to receive information from the input control unit(s) 12 which comprises a form indicator $f_{ind}$. The form indicator $f_{ind}$ may be indicative of the shape or form of the actual physical object 3 in the imaged view 2. The form indicator $f_{ind}$ may be used to describe and represent the actual shape, form and/or orientation of the surface of the object 3 facing and being perceived by 2D-camera view of the IR camera 1. Furthermore, if the object 3 in the imaged view 2 can be assumed to emit energy homogenously in every direction and the object output power value $P_{TOT}^{obj}$ is to be determined for the entire object 3, that is, not only for the surface of the object 3 facing and being perceived by 2D-camera view of the IR camera 1, the form indicator $f_{ind}$ may be used to describe and represent the 3D-shape or form of the object 3 in the imaged view 2. The form indicator $f_{ind}$, or a corresponding value stored for the particular form indicator in the memory storage unit 10 or in the processing unit 7, may be used by the processing unit 7 when calculating the object output power value $P_{TOT}^{obj}$. For example, this may be performed by the processing unit 7 by modifying Eq.11 according to the following equation, Eq. 12:

$$A = f_{ind} \cdot \sum_{x,y} a_{x,y}^{pix} \quad \text{(Eq. 12)}$$

Thus, the form indicator $f_{ind}$ may be used to adapt the surface area parameter according to the actual 3D shape and form of the object 3 in the imaged view 2.

The form indicator $f_{ind}$ may be manually inputted by the user of the IR camera 1 through the input control unit(s) 12. However, the user of the IR camera 1 may also be presented in the display unit 11 with a range of alternative object views from which the user of the IR camera 1 may select the most suitable alternative using the input control unit(s) 12, whereby the form indicator $f_{ind}$ associated with the selected object view may be used by the processing unit 7 when calculating the object output power value $P_{TOT}^{obj}$. The alternative object views may, for example, be images describing different geometric fowls and/or the angle from which the object 3 having a particular geometric form is viewed by the IR camera 1.

According to yet another alternative, if the distance d comprised in information received from the distance determining unit 8 is a distance map, the processing unit 7 may be arranged to estimate the shape or form of the actual physical object 3 in the imaged view 2 using this distance map. The distance map comprise separate distance values for different subsets of the thermal radiation data $T_{x,y}$, for example, one distance value for each captured temperature value by the detector element 5. By receiving the distance map from the distance determining unit 8, the processing unit 7 may determine the distances to each temperature value in the first subset $T_{x,y}^{obj}$ of the thermal radiation data $T_{x,y}$ corresponding to the thermal image object area 35. The processing unit 7 is thus able to achieve a 3D-representation of the object 3 in the imaged view 2 and may use the 3D-representation of the object 3 when calculating the object output power value $P_{TOT}^{obj}$. This may, for example, be performed by the processing unit 7 by determining a suitable form indicator $f_{ind}$ to be used in dependence of the 3D-representation of the object 3, or by comprising an area estimation algorithm which may estimate the surface area of the object 3 using the 3D-representation of the object 3. This may be performed for the surface of the object 3 facing and being perceived by 2D-camera view of the IR camera 1. For example, the processing unit 7 may be arranged to incorporate the 3D-representation of the object 3 in Eq. 8 by having the area $a_{x,y}^{pix}$ for each thermal image pixel in the object field-of-view $o_{fov}$ 14 of the determined thermal image object area 35 included in calculation of the object output power value $P_{TOT}^{obj}$ according to the following equation, Eq. 13:

$$P_{TOT}^{obj} = \varepsilon \cdot \sigma \cdot \sum_{x,y} a_{x,y} \cdot ((T_{x,y}^{obj})^4 - T_{rad,env}^4) + h \cdot \sum_{x,y} a_{x,y} \cdot (T_{x,y}^{obj} - T_{conv,env}) \quad \text{(Eq. 13)}$$

wherein $a_{x,y}^{pix}$ is dependent upon its corresponding value d in the distance map.

The processing unit 7 may be arranged to combine the use of a form indicator $f_{ind}$ according to the previous alternative (for example, to determine an object output power value $P_{TOT}^{obj}$ for the entire object 3, that is, not only for the surface of the object 3 facing and being perceived by 2D-camera view of the IR camera 1) with a form indicator ff$_{ind}$, or 3D representation, according to the latter alternative (for example, to determine the surface of the object 3 facing and being perceived by 2D-camera view of the IR camera 1) when calculating the object output power value $P_{TOT}^{obj}$.

Figure 4:
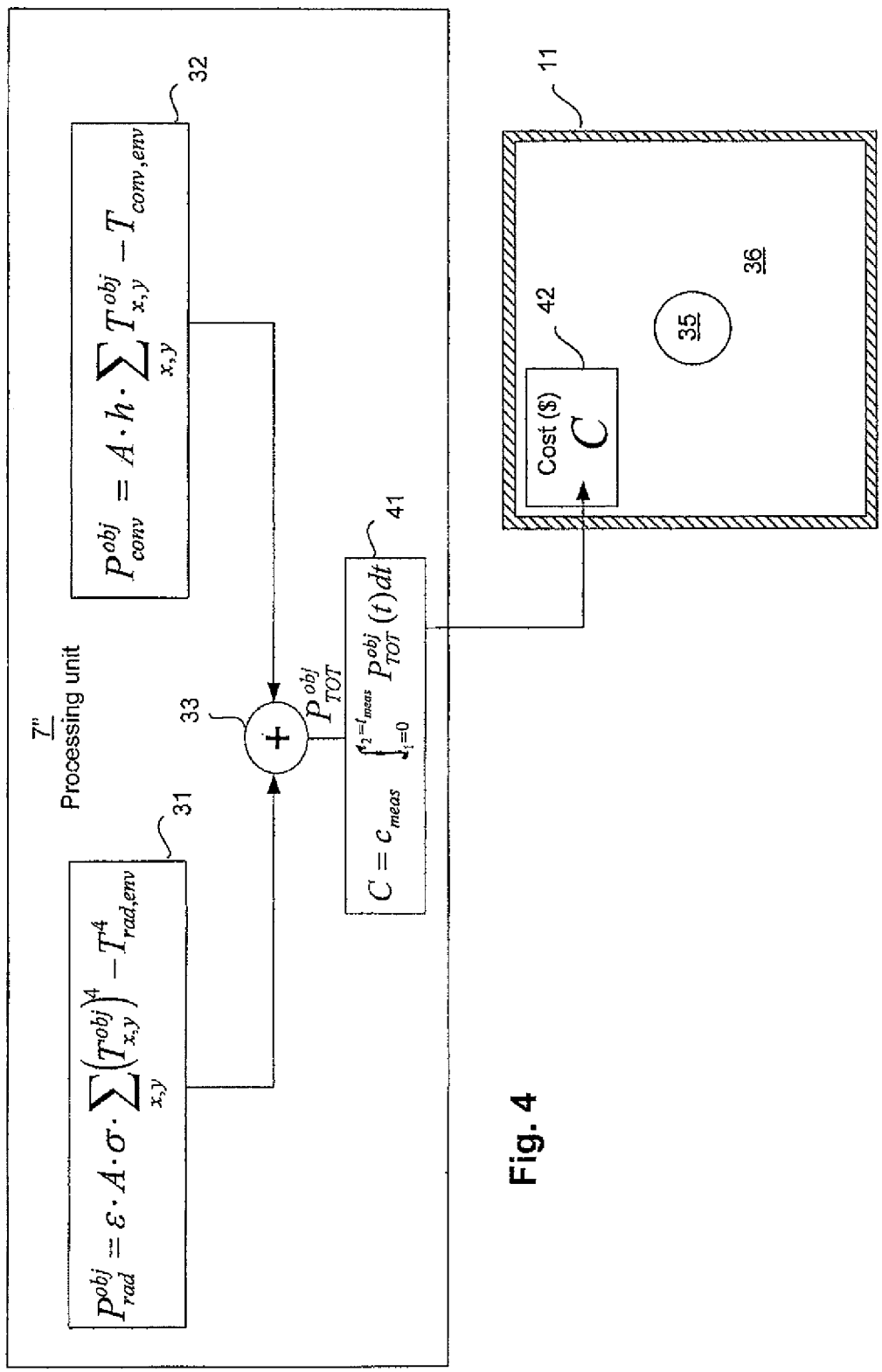
FIG. 4 shows further exemplary operation of an IR camera according to an embodiment.

FIG. 4 shows an exemplary operation of the processing unit 7 in another embodiment of an IR camera 1. The processing unit 7 according to this embodiment is identical to the processing unit 7 according the previous embodiment, except that the processing unit 7 further comprises the functionality of the logical block 41. The processing unit 7 in the IR camera 1 may be arranged to receive information comprising the current energy price information $c_{meas}$ and/or a time span information $t_{meas}$ from the input control unit(s) 12. The current energy price information $c_{meas}$ and/or a time span information $t_{meas}$ may be inputted manually by a user of the IR camera 1. The current energy price info nation $c_{meas}$ is a value that relates the object output power value $P_{TOT}^{obj}$ accumulated over time to an actual energy cost for having the object 3 emitting that amount of energy during that time. The time span information $t_{meas}$ may be obtained by having the processing unit 7 start a time span measurement when a user of the IR camera 1 indicates to the processing unit 7 using the input control unit(s) 12 that the object output power calculation according to the above should begin and stop the time span measurement when the user of the IR camera 1 indicates to the processing unit 7 using the input control unit(s) 12 that the object output power calculation according to the above should stop. The time span information $t_{meas}$ may also be provided to the processing unit 7 after the object output power calculation by the processing unit 7 has been performed over a particular time period, whereby the time span information $t_{meas}$ may indicate a subset of that particular time period. The time span information $t_{meas}$ may be used by the processing unit 7 for calculating a total energy output value $E_{TOT}^{obj}$ for the object 3 in the imaged view 2. The processing unit 7 may calculate a total energy output value $E_{TOT}^{obj}$ for the object 3 in the imaged view 2 based on the time span information $t_{meas}$ and the calculated object output power value $P_{TOT}^{obj}$ according to the following equation, Eq. 14:

$$E_{TOT}^{obj} = \int_{t_1=0}^{t_2=t_{meas}} P_{TOT}^{obj}(t) dt \qquad (\text{Eq. 14})$$

Alternatively, the processing unit 7 may calculate a total energy output value $E_{TOT}^{obj}$ for the object 3 in the imaged view 2 based on the time span information $t_{meas}=\Delta t$ and the calculated object output power value $P_{TOT}^{obj}$ according to the following equation, Eq. 15:

$$E_{TOT}^{obj} = P_{TOT}^{obj} \cdot \Delta t \qquad (\text{Eq. 15})$$

wherein $P_{TOT}^{obj}$ is assumed to be constant over time.

The processing unit 7 may calculate a total energy cost value C based on the current energy price information $c_{meas}$ and the total energy output value $E_{TOT}^{obj}$ according to the following equation, Eq. 16:

$$C = c_{meas} \cdot E_{TOT}^{obj} = c_{meas} \cdot \int_{t_1=0}^{t_2=t_{meas}} P_{TOT}^{obj}(t) dt \qquad (\text{Eq. 16})$$

The total energy cost value C may also be calculated using Eq.15.

The processing unit 7 may then control the IR camera display 11 to display the total energy cost value (as shown in FIG. 4) and/or the total energy output value $E_{TOT}^{obj}$ to a user of the IR camera 1 together with the thermal images. The displayed total energy cost value (as shown in FIG. 4) and/or total energy output value $E_{TOT}^{obj}$ may also be displayed in the display unit 11 a running value that is continuously updated for an time span that has begun, but not been stopped yet. The displayed total energy cost value (as shown in FIG. 4) and/or total energy output value $E_{TOT}^{obj}$ may also be displayed in the display unit 11 in a separate indicator window 42. This enables a simple and clear identification of the total energy cost value (as shown in FIG. 4) and/or total energy output value $E_{TOT}^{obj}$ by the user of the IR camera 1.

Figure 5:
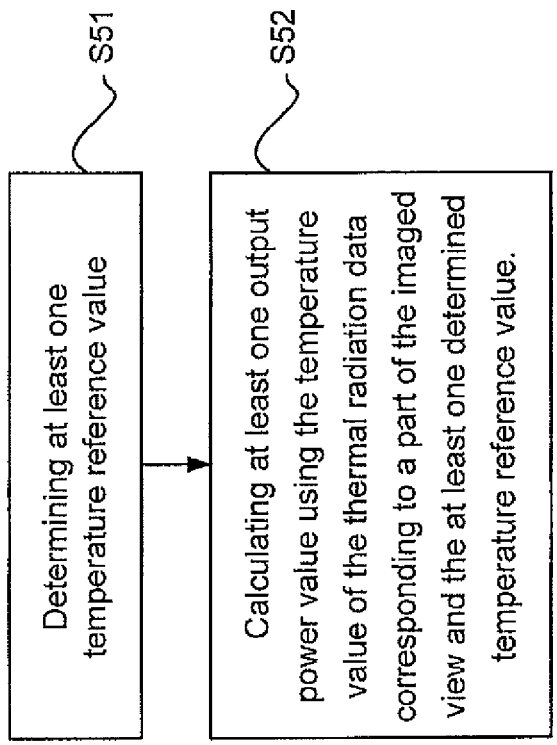
FIG. 5 is a flowchart illustrating a method according to an exemplary embodiment.

FIG. 5 is a flowchart illustrating a method to be used in a processing unit 7 in an exemplary embodiment of an IR camera 1. In step S51, the processing unit 7 may determine at least one temperature reference value. The at least one temperature reference value may represent the temperature of the surrounding environment of an imaged view in the IR camera. In step S52, the processing unit 7 may calculate at least one output power value using the temperature value of the thermal radiation data corresponding to a part of the imaged view and the at least one determined temperature reference value. The at least one output power value being indicative of an amount of energy dissipated in that part of the imaged view. The method described in reference to FIG. 5 may further include the step of controlling an IR camera display to display the at least one calculated output power value to a user of the IR camera in place of the corresponding temperature pixel in the thermal image.

Figure 6:
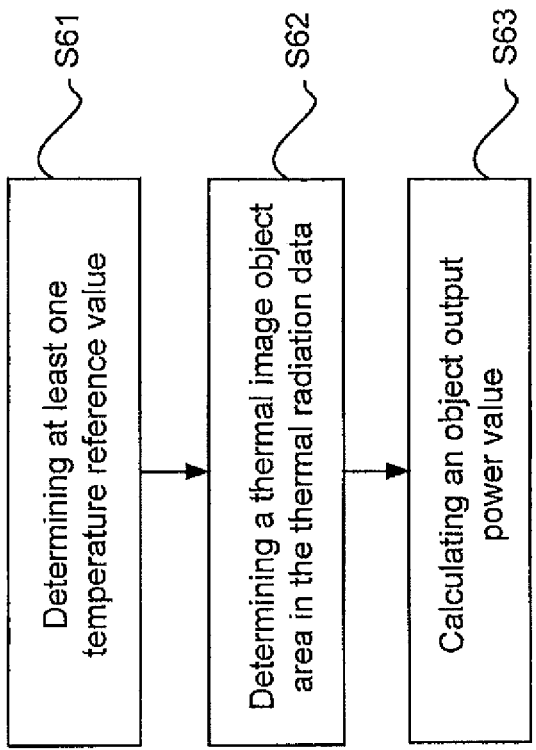
FIG. 6 is a flowchart illustrating a method according to an exemplary embodiment.

FIG. 6 is a flowchart illustrating a method to be used in a processing unit 7, as described with respect to FIG. 3, in an exemplary embodiment of an IR camera 1. Step S61 is identical to step S51 described above. In step S62, the processing unit 7 may determine a thermal image object area in the thermal radiation data. This may be performed by determining a first subset of the thermal radiation data as a thermal image object area representing an object in the imaged view for which an output power value is to be determined. In step S63, the processing unit 7 may calculate an object output power value. This may be performed by calculating an object output power value indicative of the amount of energy outputted from the object in the imaged view based upon output power values of the determined thermal image object area in the thermal radiation data. The method described in reference to FIG. 6 may further include the step of controlling the IR camera display to display the calculated object output power value to a user of the IR camera together with the thermal images.

Figure 7:
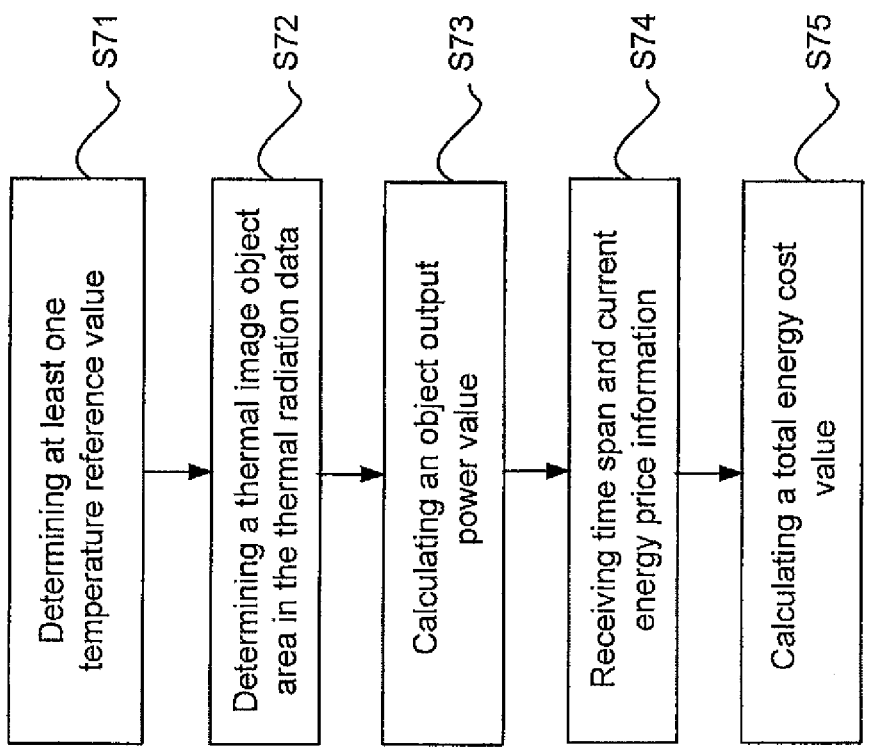
FIG. 7 is a flowchart illustrating a method according to an exemplary embodiment.

FIG. 7 is a flowchart illustrating a method according to an exemplary embodiment. Step S71-S73 is identical to the steps S61-S63 according to the above.

In step S74, the processing unit 7 may receive a time span and current energy price information. In step S75, the processing unit 7 may calculate a total energy cost value. This may be performed by calculating a total energy output value for the object in the imaged view based on the time span information and the calculated object output power value, and by then calculating a total energy cost value based on the current energy price information and the calculated total energy output value. The method according to FIG. 5 may further include the step of controlling the IR camera display to display total energy cost value and/or the total energy output value to a user of the IR camera together with the thermal images.

The description is not intended to be taken in a limiting sense, but is made merely for the purpose of describing the general principles of several optional embodiments. The scope of the invention should only be ascertained with reference to the issued claims.

What is claimed is:

1. An apparatus comprising:
   a thermal radiation capturing arrangement configured to capture thermal radiation data of an imaged view;
   one or more input control units configured to receive manual inputs from a user of the apparatus and further to output the manual inputs as user input information; and
   a processor configured to:
      receive the thermal radiation data from the thermal radiation capturing arrangement,
      receive the user input information from at least one of the one or more input control units,
      determine a radiated temperature reference value and a convection temperature reference value representing temperatures of an environment surrounding an object in the imaged view, and
      calculate an object power value indicative of an amount of energy dissipated from the object in the imaged view based on at least:
         a radiation power value based on at least the radiated temperature reference value and a portion of the thermal radiation data corresponding to the object, and
         a convection power value based on at least the convection temperature reference value and the portion of the thermal radiation data corresponding to the object.

2. The apparatus of claim 1, wherein:
   the processor is further configured to generate a thermal image of the imaged view using the thermal radiation data and the calculated object power value, the thermal image comprising one or more pixels representing the calculated object power value according to a color palette; and the apparatus comprises a display configured to present the thermal image for viewing by the user.

3. The apparatus of claim 1, wherein:
the user input information comprises energy price information and time span information; and
the processor is further configured to calculate a total energy cost estimate for the object in the imaged view based on the calculated object power value, the energy price information, and the time span information.

4. The apparatus of claim 1, wherein the object power value is calculated in response to at least part of the user information.

5. The apparatus of claim 4, wherein:
the at least part of the user input information comprises an indication of an area in the imaged view representing the object; and
the processor is configured to identify the portion of the thermal radiation data corresponding to the object in the imaged view to calculate the object power value, in response to the indication of the area representing the object.

6. The apparatus of claim 4, wherein:
the at least part of the user input information comprises a temperature threshold value; and
the processor is configured to identify the portion of the thermal radiation data corresponding to the object in the imaged view to calculate the object power value, in response to the temperature threshold value.

7. The apparatus of claim 6, wherein the identified portion of the thermal radiation data has a temperature value equal to or above the temperature threshold value.

8. The apparatus of claim 4, wherein
the at least part of the user input information comprises a form indicator that is indicative of the shape or form of the object in the imaged view.

9. The apparatus of claim 4, wherein
the at least part of the user input information comprises an emissivity value that is indicative of the emissivity of a surface of the object in the imaged view.

10. The apparatus of claim 1, further comprising a distance determining unit configured to determine distance information representing a distance from the apparatus to the object in the imaged view, wherein the processor is further configured to:
determine an object field-of-view associated with the object represented by the portion of the thermal radiation data;
estimate an actual physical surface area of the object in the imaged view facing towards the apparatus based upon the distance information and the determined object field-of-view; and
calculate the object power value using the estimation of the actual physical surface area of the object.

11. The apparatus of claim 1, wherein
the user input information comprises a user temperature reference value; and
the processor is configured to determine the radiated temperature reference value and/or the convection temperature reference value based on the user temperature reference value.

12. A method of calculating an amount of energy dissipated from an object in an imaged view, the method comprising:

capturing thermal radiation data of the imaged view using an infrared (IR) camera;
receiving, at one or more input control units of the IR camera, manual inputs from a user as user input information;
determining a radiated temperature reference value and a convection temperature reference value representing temperatures of an environment surrounding an object in the imaged view; and
calculating an object power value indicative of the amount of energy dissipated from the object in the imaged view based on at least:
a radiation power value based on at least the radiated temperature reference value and a portion of the thermal radiation data corresponding to the object, and
a convection power value based on at least the convection temperature reference value and the portion of the thermal radiation data corresponding to the object.

13. The method of claim 12, further comprising:
generating a thermal image of the imaged view using the thermal radiation data and the calculated object power value, the thermal image comprising one or more pixels representing the calculated output power value according to a color palette; and
displaying the generated thermal image for viewing by the user.

14. The method of claim 12, wherein:
the user input information comprises energy price information and time span information; and
the method further comprises calculating a total energy cost estimate for the object in the imaged view based on the calculated object power value, the energy price information, and the time span information.

15. The method of claim 12, wherein the object power value is calculated in response to at least part of the user information.

16. The method of claim 15, wherein:
the at least part of the user input information comprises an indication of an area in the imaged view representing the object; and
the calculating of the object power value comprises identifying the portion of the thermal radiation data corresponding to the object in the imaged view, in response to the indication of the area representing the object.

17. The method of claim 15, wherein:
the at least part of the user input information comprises a temperature threshold value;
the calculating of the object power value comprises identifying the portion of the thermal radiation data corresponding to the object in the imaged view, in response to the temperature threshold value; and
the identified portion of the thermal radiation data has a temperature value equal to or above the temperature threshold value.

18. The method of claim 15, wherein
the at least part of the user input information comprises a form indicator that is indicative of the shape or form of the object in the imaged view.

19. The method of claim 15, wherein
the at least part of the user input information comprises an emissivity value that is indicative of the emissivity of a surface of the object in the imaged view.

20. The method of claim 12, wherein:
the user input information comprises a user temperature reference value; and
the determining the radiated temperature reference value or the convection temperature reference value is based on the user temperature reference value.

\* \* \* \* \*